United States Patent [19]

Tipley et al.

[11] Patent Number: 5,325,504
[45] Date of Patent: Jun. 28, 1994

[54] METHOD AND APPARATUS FOR INCORPORATING CACHE LINE REPLACEMENT AND CACHE WRITE POLICY INFORMATION INTO TAG DIRECTORIES IN A CACHE SYSTEM

[75] Inventors: Roger E. Tipley; Philip C. Kelly, both of Houston, Tex.

[73] Assignee: Compaq Computer Corporation, Houston, Tex.

[21] Appl. No.: 752,761

[22] Filed: Aug. 30, 1991

[51] Int. Cl.⁵ .............................. G06F 12/02
[52] U.S. Cl. .................. 395/425; 395/400; 364/DIG. 1; 364/246.12
[58] Field of Search ... 364/200 MS File, 900 MS File; 395/400, 425

[56] References Cited

U.S. PATENT DOCUMENTS

| | | | |
|---|---|---|---|
| 4,493,026 | 1/1985 | Olnowich | 295/425 |
| 4,736,293 | 4/1988 | Patrick | 395/425 |
| 5,043,885 | 8/1991 | Robinson | 395/425 |
| 5,060,136 | 10/1991 | Furney et al. | 395/425 |
| 5,091,851 | 2/1992 | Shelton et al. | 395/425 |
| 5,119,485 | 6/1992 | Ledbetter, Jr. et al. | 395/425 |
| 5,125,085 | 6/1992 | Phillips | 395/400 |
| 5,140,690 | 8/1992 | Hata et al. | 395/425 |
| 5,155,824 | 10/1992 | Edenfield et al. | 395/425 |

OTHER PUBLICATIONS

James Archibald and Jean-Loup Baier, "An Evaluation of Cache Coherence Solutions in Shared-Bus Multiprocessors," Oct. 18, 1985, pp. 1–32.

Paul Sweazey and Alan Jay Smith, "A Class of Compatible Cache Consistency Protocols and their Support by the IEEE Futurebus," 13th International Symposium on Computer Architecture 1986, pp. 414–423.

James R. Goodman, "Using Cache Memory to Reduce Processor-Memory Traffic," 1983, pp. 124–131.

Primary Examiner—Joseph L. Dixon
Assistant Examiner—Hiep T. Nguyen
Attorney, Agent, or Firm—Pravel, Hewitt, Kimball & Krieger

[57] ABSTRACT

A method and apparatus for incorporating cache line replacement and cache write policy information into the tag directories in a cache system. In a 2 way set-associative cache, one bit in each way's tag RAM is reserved for LRU information, and the bits are manipulated such that the Exclusive-OR of each way's bits points to the actual LRU cache way. Since all of these bits must be read when the cache controller determines whether a hit or miss has occurred, the bits are available when a cache miss occurs and a cache line replacement is required. The method can be generalized to caches which include a number of ways greater than two by using a pseudo-LRU algorithm and utilizing group select bits in each of the ways to distinguish between least recently used groups. Cache write policy information is stored in the tag RAM's to designate various memory areas as write-back or write-through. In this manner, system memory situated on an I/O bus which does not recognize inhibit cycles can have its data cached.

15 Claims, 4 Drawing Sheets

METHOD AND APPARATUS FOR INCORPORATING CACHE LINE REPLACEMENT AND CACHE WRITE POLICY INFORMATION INTO TAG DIRECTORIES IN A CACHE SYSTEM

BACKGROUND OF THE INVENTION

1. Field of the Invention

The present invention relates to microprocessor cache subsystems in computer systems, and more specifically to a method for incorporating least recently used and cache write policy information into the tag memories of a cache system.

2. Description of the Prior Art

The personal computer industry is a vibrant and growing field that continues to evolve as new innovations occur. The driving force behind this innovation has been the increasing demand for faster and more powerful computers. A major bottleneck in personal computer speed has historically been the speed with which data can be accessed from memory, referred to as the memory access time. The microprocessor, with its relatively fast processor cycle times, has generally been delayed by the use of wait states during memory accesses to account for the relatively slow memory access times. Therefore, improvement in memory access times has been one of the major areas of research in enhancing computer performance.

In order to bridge the gap between fast processor cycle times and slow memory access times, cache memory was developed. A cache is a small amount of very fast, and expensive, zero wait state memory that is used to store a copy of frequently accessed code and data from main memory. The microprocessor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring wait states. If the data is not in the cache, then a cache read miss takes place, and the memory request is forwarded to the system and the data is retrieved from main memory, as would normally be done if the cache did not exist. On a cache miss, the data that is retrieved from memory is provided to the processor and is also written into the cache due to the statistical likelihood that this data will be requested again by the processor.

An efficient cache yields a high "hit rate", which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of the microprocessor, cache hits are serviced locally without requiring use of the processor or host bus. Therefore, a processor operating out of its local cache has a much lower "bus utilization." This reduces host bus bandwidth used by the processor, making more bandwidth available for other processors or bus masters.

An important consideration in cache performance is the organization of the cache and the cache management policies that are employed in the cache. A cache can generally be organized into either a direct-mapped or set-associative configuration. In a direct-mapped organization, the physical address space of the computer is conceptually divided up into a number of equal pages, with the page size equaling the size of the cache. The cache is divided up into a number of sets, with each set having a certain number of lines. Each of the pages in main memory has a number of lines equivalent to the number of lines in the cache, and each line from a respective page in main memory corresponds to a similarly located line in the cache. An important characteristic of a direct-mapped cache is that each memory line from a page in main memory, referred to as a page offset, can only reside in the equivalently located line or page offset in the cache. Due to this restriction, the cache only need refer to a certain number of the upper address bits of a memory address, referred to as a tag, to determine if a copy of the data from the respective memory address resides in the cache because the lower order address bits are pre-determined by the page offset of the memory address.

Whereas a direct-mapped cache is organized as one bank of memory that is equivalent in size to a conceptual page in main memory, a set-associative cache includes a number of banks, or ways, of memory that are each equivalent in size to a conceptual page in main memory. Accordingly, a page offset in main memory can be mapped to a number of locations in the cache equal to the number of ways in the cache. For example, in a 4-way set associative cache, a line or page offset from main memory can reside in the equivalent page offset location in any of the four ways of the cache.

A set-associative cache generally includes a replacement algorithm that determines which bank, or way, in which to fill data when a read miss occurs. Many set-associative caches use some form of a least recently used (LRU) algorithm that places new data in the way that was least recently accessed. This is because, statistically, the way most recently used or accessed to provide data to the processor is the one most likely to be needed again in the future. Therefore, the LRU algorithm generally ensures that the block which is replaced is the least likely to have data requested by the cache. An LRU algorithm is generally maintained by keeping LRU bit information associated with each set that points to the way least recently used.

Another replacement algorithm that can be used is referred to as a least recently modified (LRM) algorithm. In an LRM scheme, the LRU information is not updated on every cache read and write hit, but is updated when there is a cache line replacement or write hit. Other replacement techniques referred to as pseudo-LRU techniques have also been developed. One example of a pseudo-LRU technique is the internal cache in the Intel Corporation i486 microprocessor, which uses a 4-way set associative cache architecture. In this method, the four ways are grouped into two sets of two ways. Three bits are provided to determine first, which of the two groups was least recently used and then second, which of the two ways in the least recently used group was least recently used. This is a pseudo-LRU technique because it does not account for properly reshuffling the replacement order based on read hits to a particular way.

Cache management is generally performed by a device referred to as a cache controller. The cache controller includes a directory that holds an associated entry for each set in the cache. This entry generally has two components: a tag and a number of tag state bits. The tag acts as a main memory page number, and it holds the upper address bits of the particular page in main memory from which the copy of data residing in the respective set of the cache originated. The tag state bits determine the status of data in the respective set in the cache. In single processor schemes, the tag state bits generally comprise one or more valid bits which indicate whether the data associated with the respective tag entry is valid. In multiprocessor systems, the tag state bits generally indicate the status of data with respect to the other caches, as is explained further below.

The directories for each of the sets in the cache are generally stored in random access memory referred to as tag RAM's. Most conventional cache controllers also include a separate RAM for the LRU information to keep track of which way has been least recently used for each of the respective sets. However, the use of a separate RAM for LRU information is generally wasteful and unnecessary if extra bits can be made available in the tag RAM's. Therefore, a method is desired to allow LRU information to be stored in the tag RAM's to obviate the necessity of having an additional RAM exclusively for LRU information.

Multiprocessing is a major area of research in computer system architecture. Multiprocessing involves a computer system which includes multiple processors that work at the same time on different problems. In most multiple processor systems, each processor includes its own local cache. In this manner, each processor can operate out of its cache when it does not have control of the bus, thereby increasing system efficiency. However, one difficulty that has been encountered in multiprocessor architectures is the maintenance of cache coherency when each processor includes its own local cache.

As previously mentioned, cache management is performed by a device referred to as a cache controller. A principal cache management responsibility in multiprocessor systems is the preservation of cache coherency. The type of cache management policy used to maintain cache coherency in a multiprocessing system generally depends on the architecture used. One type of architecture commonly used in multiprocessing systems is referred to as a bus-based scheme. In a bus-based scheme, system communication takes place through a shared bus, and this allows each cache to monitor other requests by watching or snooping the bus. Each processor has a cache which monitors activity on the bus and in its own processor and decides which blocks of data to keep and which to discard in order to reduce bus traffic. Requests by a processor to modify a memory location that is stored in more than one cache requires bus communication in order for each copy of the corresponding line to be marked invalid or updated to reflect the new value.

Various types of cache coherency protocols can be employed to maintain cache coherency in a multiprocessor system. One type of cache coherency protocol that is commonly used is referred to as a write-through scheme. In a write-through scheme, all cache writes or updates are simultaneously written into the cache and to main memory. Other caches on the bus must monitor bus transactions and invalidate any matching entries when the memory block is written through to main memory. In a write-back scheme, a cache location is updated with the new data on a processor write hit, and main memory is generally only updated when the updated data block must be exchanged with a new data block or the updated block is requested by another processor.

Multiprocessor cache systems which employ a write-back scheme generally utilize some type of ownership protocol to maintain cache coherency. In this scheme, any copy of data in a cache must be identical to the owner of that location's data. The owner of a location's data is generally defined as the respective location having the most recent version of the data residing in the respective memory location. Ownership is generally acquired through special read and write operations defined in the ownership protocol.

A cache that owns a data entry assumes responsibility for the data's validity in the entire system. The cache that owns a particular data entry is responsible for ensuring that main memory is properly updated, if necessary, and that ownership is passed to another cache when appropriate. The owning cache is also responsible for providing the correct copy of data to other processors or devices which request the data during a read cycle. When a cache owns a data entry and snoops a read cycle generated by another device or processor requesting the data, the cache must inhibit the system memory from providing the data and provide the correct copy of data to the requesting device.

As previously mentioned, the cache controller includes a directory that holds an associated tag entry for each data entry or set in the cache. Each tag entry is comprised of a tag and a number of tag state bits. The tag state bits determine the status of the data in the respective set of the cache, i.e. whether the data is invalid, owned, or shared with another cache, etc. The cache controller also includes a snooping mechanism which monitors or snoops the host bus when other processors or devices are using the host bus. The cache controller maintains cache coherency by updating the tag state bits for a data entry whenever the cache obtains or relinquishes ownership and in certain instances when the snooping mechanism detects a read or write cycle for data stored in the cache.

Most cache systems can cache the majority of computer system addresses. However, a portion of the address space is generally deemed non-cacheable for various reasons. For example, the input/output (I/O) address space is generally designated as non-cacheable to prevent I/O addresses from being placed in the cache. This is because data stored in I/O addresses is subject to frequent change or may control physical devices. In addition, in most computer systems the I/O bus is separate from the host or processor bus, and therefore data stored in I/O addresses are subject to change without any activity occurring on the host bus. Thus, data stored in these I/O addresses can change without being detected by the cache controllers situated on the host bus. In addition, video memory located on the I/O bus is generally designated as non-cacheable due to its dual ported nature.

In many computer systems, there is generally some system memory situated on an I/O bus which can be designated as cacheable. For example, if the system read only memory (ROM) is situated on the I/O bus, then this memory can be designated as cacheable. However, it should be noted that if system ROM is designated as cacheable, this memory must also be write-protected in the cache to prevent the processor from inadvertently changing ROM data stored in the cache. In addition, if the I/O bus includes slots for expansion memory, then memory placed in these slots can be designated as cacheable. However, a problem arises in a multiprocessor write-back cache architecture where system memory situated on the I/O bus is designated as cacheable if the I/O bus cannot recognize inhibit cycles. As previously mentioned, in a write-back cache architecture if a cache controller snoops a read hit to an owned or modified location, the cache must inhibit the current memory cycle by the memory controller or memory device and provide the data to the requesting device. However, if the I/O bus does not recognize inhibit cycles, the cache which owns the data will not be able to inhibit the system memory on the I/O bus from returning incorrect or "dirty" data to the requesting device, resulting in cache coherency problems. In addition, the system memory on the I/O bus and the cache controller may both attempt to return data to the requesting device, resulting in bus contention problems.

Therefore, in multiprocessor, write-back cache architectures which include an I/O bus that does not recognize inhibit cycles, it is generally not possible to cache the system memory situated on the I/O bus. However, if the system memory situated on the I/O bus could be designated as write-through in each of the caches, then no problems would result since there would never be a need for an inhibit cycle for this memory. No inhibit cycles would be needed if a write-through protocol was used since the system memory, not the cache, would always be the owner of data it contains. Therefore, a method is needed which enables a cache controller to designate memory address spaces as write-through or write-backable in a computer system. In addition, this method must be easily accessed by the cache controller to prevent a cache write policy determination from degrading system performance.

Background on the Extended Industry Standard Architecture (EISA) is deemed appropriate. EISA is a superset of the Industry Standard Architecture (ISA), a bus architecture introduced in the International Business Machines (IBM) PC AT personal computer. The EISA bus is built around an EISA chip set which includes an EISA bus controller (EBC) chip, among others. The EBC acts as an interface between a host or processor bus and the EISA (I/O) bus. Preferably the 82358 from Intel Corporation is used as the EBC. The 82358 does not include an inhibit input, and therefore the EISA bus does not recognize inhibit cycles.

SUMMARY OF THE INVENTION

The present invention includes a method and apparatus for incorporating LRU and cache write policy information into the tag RAM's in a cache controller. The incorporation of LRU information into the tag RAM's obviates the necessity of having an extra RAM exclusively for LRU information. The incorporation of cache write policy information into the tag RAM's enables caching of system memory situated on an I/O bus which does not recognize inhibit cycles. In addition, the incorporation of cache write policy information into the tag RAM's allows a ready determination of the cache write policy used whenever the associated tag entry is read. Since the tag entry must be read on each cache access to determine if the tag matches the address provided to the cache, the cache write policy information can be determined without degrading system performance.

The method according to the present invention for incorporating LRU information into the tag RAM's is implemented in a 2-way set-associative cache in the preferred embodiment. The cache may generally use any type of cache replacement algorithm according to the present invention. In the preferred embodiment, the cache uses a modified LRU replacement algorithm referred to as least recently modified (LRM). The LRM algorithm used in the preferred embodiment updates the LRU bits on write hits and on cache line replacements caused by read misses. The method according to the present invention can be generalized to caches which include a greater number of ways than two by using an LRU, LRM, pseudo-LRU or pseudo-LRM replacement algorithm.

According to the present invention, one bit in the entries of each way's tag RAM, referred to as a partial LRU bit, is reserved for LRU information. The LRU bits are manipulated in such a way that the Exclusive-OR of both way's partial LRU bits forms the actual LRU information used by the cache controller. Both LRU bits are available during a cache read because the cache controller must read both way's tags to determine whether a hit or miss has occurred. If a match occurs in one of the respective tags, then the corresponding cache way is accessed by the processor. By definition, the cache way that is currently being accessed is the most recently used. Therefore, logic is used to manipulate the partial LRU bits so that an Exclusive-OR of these bits points to the way opposite of the way being used on each tag write or line replacement.

The manipulation of the partial LRU bits during an LRU update is as follows. Since only one way's tag can be written at a time, the partial LRU bit for the other way remains unchanged. The new partial LRU bit value for the way being changed is as follows. The new value for the partial LRU bit of way 0 becomes the opposite or inverted value of the old partial LRU bit of way 1. The new value for the partial LRU bit of way 1 becomes the old partial LRU bit for way 0. When way 0 is written with the inverted value of LRU1, the two partial LRU bits are always different and thus the Exclusive-OR of these bits point to way 1 as the least recently used. When way 1 is written with LRU0, the two partial LRU bits are always the same and thus the Exclusive-OR of these bits point to way 0 as the least recently used.

In the preferred embodiment, the computer system includes a host or processor bus that is separate from an I/O bus. The host bus includes random access memory referred to as main memory and a memory controller. Expansion memory and system read only memory are preferably situated on the I/O bus. The I/O bus is preferably of a type that does not recognize inhibit or abort cycles. The present invention is preferably implemented in a multiprocessor, multiple cache computer system wherein each tag entry in the tag RAM's includes a number of tag state bits. The tag state bits define a number of states which includes a state referred to as shared unmodified. In the preferred embodiment, the shared unmodified state indicates that there may be more than one cache with an unmodified copy of a particular location's data and that processor write hits must be broadcast to main memory. In addition, one bit in each of the tag entries, referred to as the CW bit, is reserved for cache write policy information according to the present invention.

The memory controller includes associated Data Destination Facility (DDF) logic which generates a signal referred to as H_CW. The H_CW signal conveys cache write policy information to each of the caches when data from computer system memory is provided to the caches. In the preferred embodiment, the H_CW line is generated by the DDF logic on each memory read or write cycle, regardless of whether the data is located in main memory or in memory situated on the I/O bus. In the preferred embodiment, the H_CW line is negated low when system memory on the I/O bus provides data to a cache, indicating that the cache write policy for this data should be designated as write-through. The H_CW signal is asserted high when main memory on the host bus provides data to a cache, indicating that the cache write policy for this data should be designated as write-back.

Each of the cache controllers in the system receives the H_CW signal to determine whether the cache write protocol for the data it receives should be designated as write-through or write-back. When the H_CW signal is asserted high and a write-back policy is designated, the CW bit in the tag entry is set to a logic high value, and the tag state bits are manipulated as would normally occur in a write-back cache environment. When the H_CW signal is negated low and a write-through policy is designated, the CW bit in the tag entry is set to a logic low value, and the tag state bits for the respective data entry stored in the cache are set to the shared unmodified state. The CW state bit keeps track of the cache write protocol associated with each data entry. When the CW bit is negated low, indicating a write-through policy, the negated CW bit maintains the tag state as shared unmodified and prevents the tag state from being inadvertently changed by the cache controller. In this manner, the respective data entry in the cache is essentially designated as write-through since a write hit to a shared unmodified data entry always results in the new value being broadcast to its system memory location. In addition, a bit in each tag entry referred to as the write protect (WP) bit includes write policy information that determines whether a write protect policy is employed for the respective cache location. The WP bit is asserted for a respective cache location when the corresponding data location is read only. When the WP bit is asserted in a tag entry, the corresponding cache location cannot be modified, and the tag state bits are maintained in the shared state, thus maintaining a write-through policy for this data.

Therefore, a method for incorporating LRU and cache write policy information into the tag RAM's is disclosed. The incorporation of LRU information into the tag RAM's removes the necessity of having a separate RAM for LRU information. In addition, the incorporation of cache write policy information into the tag RAM's allows the cache controller to maintain write-back and write-through policies for different data entries, thereby allowing system memory located on an I/O bus which does not recognize inhibit cycles to be cached.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

The following related disclosures are herein incorporated by reference:

U.S. Application Ser. No. 753,420, entitled "Multiprocessor Cache Snoop Access Protocol" by Mike T. Jackson, Jeffrey C. Stevens, and Roger E. Tipley, filed on Aug. 30, 1991; and U.S. Application Ser. No. 753,199, entitled "Multiprocessor Cache Arbitration" by Jeffrey C. Stevens, Mike T. Jackson, Roger E. Tipley, Jens K. Ramsey, Sompong Olarig, and Philip C. Kelly filed on Aug. 30, 1991; both of which are assigned to the assignee of this invention.

Figure 1:
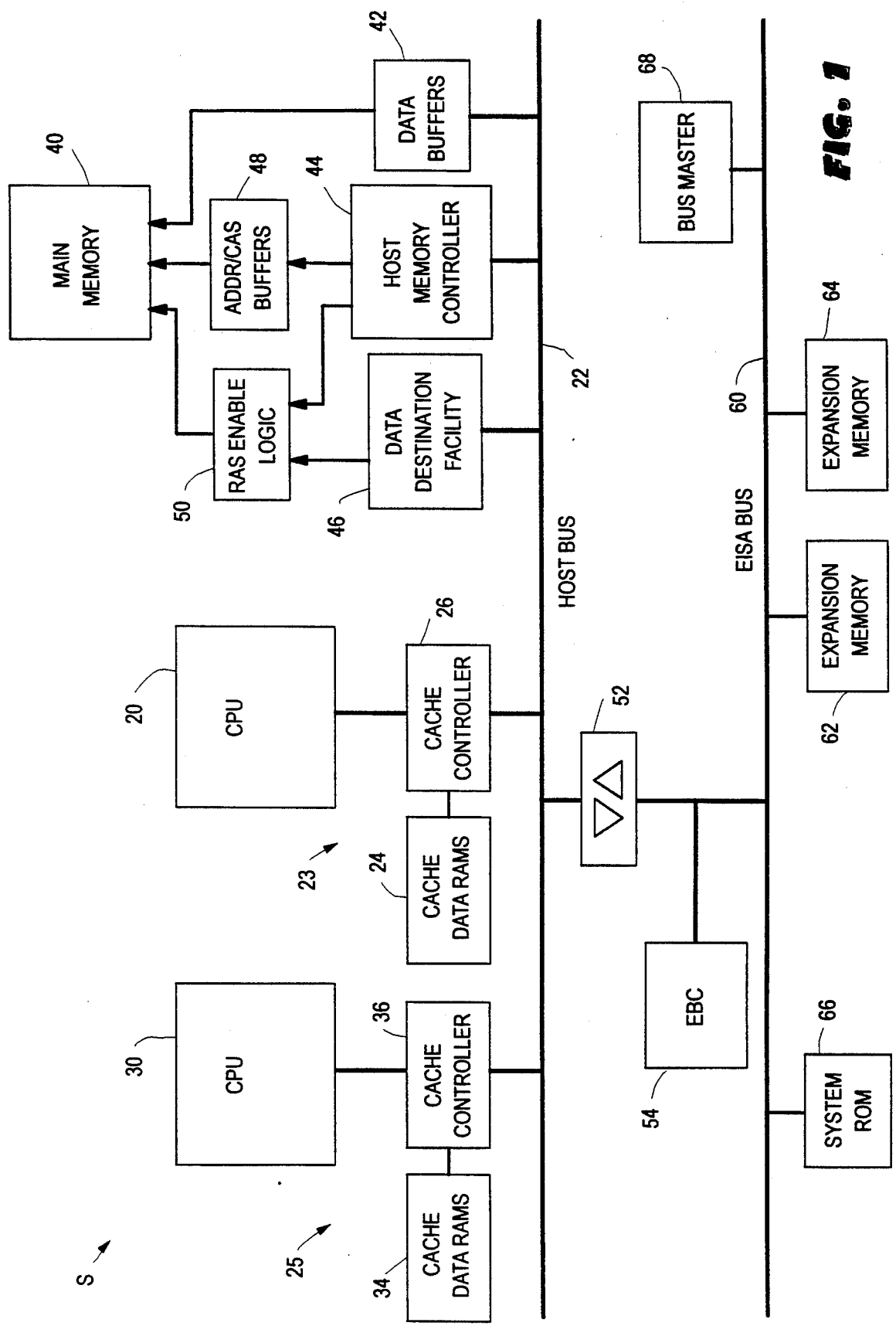
FIG. 1 is a block diagram of a multiprocessor computer system including microprocessor cache systems according to the present invention.

Referring now to FIG. 1, a computer system S is generally shown. Many of the details of a computer system that are not relevant to the present invention have been omitted for the purpose of clarity. In the description that follows, signal names followed by an asterisk are asserted when they have a logic low value. The computer system S preferably includes multiple microprocessors. However, it is understood that the incorporation of the present invention into single processor computer systems can be readily accomplished. The system S includes two microprocessors 20 and 30 coupled to a host bus 22. Each of the microprocessors 20 and 30 have associated cache subsystems 23 and 25, respectively, comprising caches 24 and 34 and cache controllers 26 and 36, respectively, coupled between the respective microprocessors 20 and 30 and the host bus 22. The caches 24 and 34 are preferably organized as 2 way set-associative caches according to the present embodiment. However, the LRU method according to the present invention can be generalized to work with caches which include a number of ways greater than 2, as is explained below. The host bus 22 includes address, data and control portions.

Main memory 40 is preferably dynamic random access memory. The memory 40 interfaces with the host bus 22 via a data buffer circuit 42, a memory controller circuit 44 and a data destination facility (DDF) 46. The buffer 42 performs data transceiving and parity generating and checking functions. The memory controller 44 and the DDF 46 interface with the memory 40 via address multiplexor and column address strobe buffers 48 and row address (RAS) enable logic circuit 50. The DDF 46 generates RAS and address signals as well as cache write protocol information regarding data provided to the cache systems 23 and 25, as is explained below. In the following discussion, cache write policy information may designate either a write-back policy or write-through policy to be employed. For more details on the operation of the DDF 46, reference is made to Ser. No. 431,666 filed Nov. 3, 1988 and assigned to the same assignee us this invention, which is hereby incorporated by reference.

The host bus 22 is coupled to an I/O bus 60 through bus transceivers 52. The I/O bus 60 is preferably based on the Extended Industry Standard Architecture (EISA). An EISA Bus Controller (EBC) 54, preferably the 82358 from Intel, is coupled between the host bus 22 and the EISA bus 60, as is standard in EISA systems. The EISA bus 60 preferably includes a plurality of expansion slots which hold expansion memory 62 and 64. Read only memory (ROM) 66 and an EISA bus master 68 are also preferably coupled to the EISA bus 60. In the discussion that follows, main memory 40, ROM 66, and expansion memory 62 and 64 are collectively referred to as system memory.

The DDF 46 is a memory mapping and memory module enabling circuit which, in addition to other functions, stores various parameters about memory blocks in the computer system S. The DDF 46 generates a signal referred to as H_CW, which indicates the cache write policy used for the particular memory block after the memory address is placed on the host bus 22. The H_CW signal is a control signal on the host bus 22 and is provided to an input of each of the cache controllers 26 and 36. The H_CW signal is generated by the DDF 46 any time data is output from system memory to a cache. The H_CW signal is preferably negated low when data is provided from the expansion memory 62 and 64 or the ROM 66 situated on the EISA bus 60 to a cache, indicating that the cache write policy employed for the respective data entry is write-through. The H_CW signal is preferably asserted high when data is provided from main memory 40 to a cache, indicating that a write-back policy is employed for the respective data entry. The DDF 46 is programmed upon initialization of the computer system S, with the H_CW bit generally not being changed after this period. The H_CW bit and other bits in the DDF 46 require operations other than a simple memory operation to be set. Therefore the H_CW values for given areas will not accidently be changed. The DDF 46 also preferably generates a signal referred to as W_P to each of the cache controllers 26 and 36 which conveys the write protect policy to be employed for respective data entries.

Figure 2:
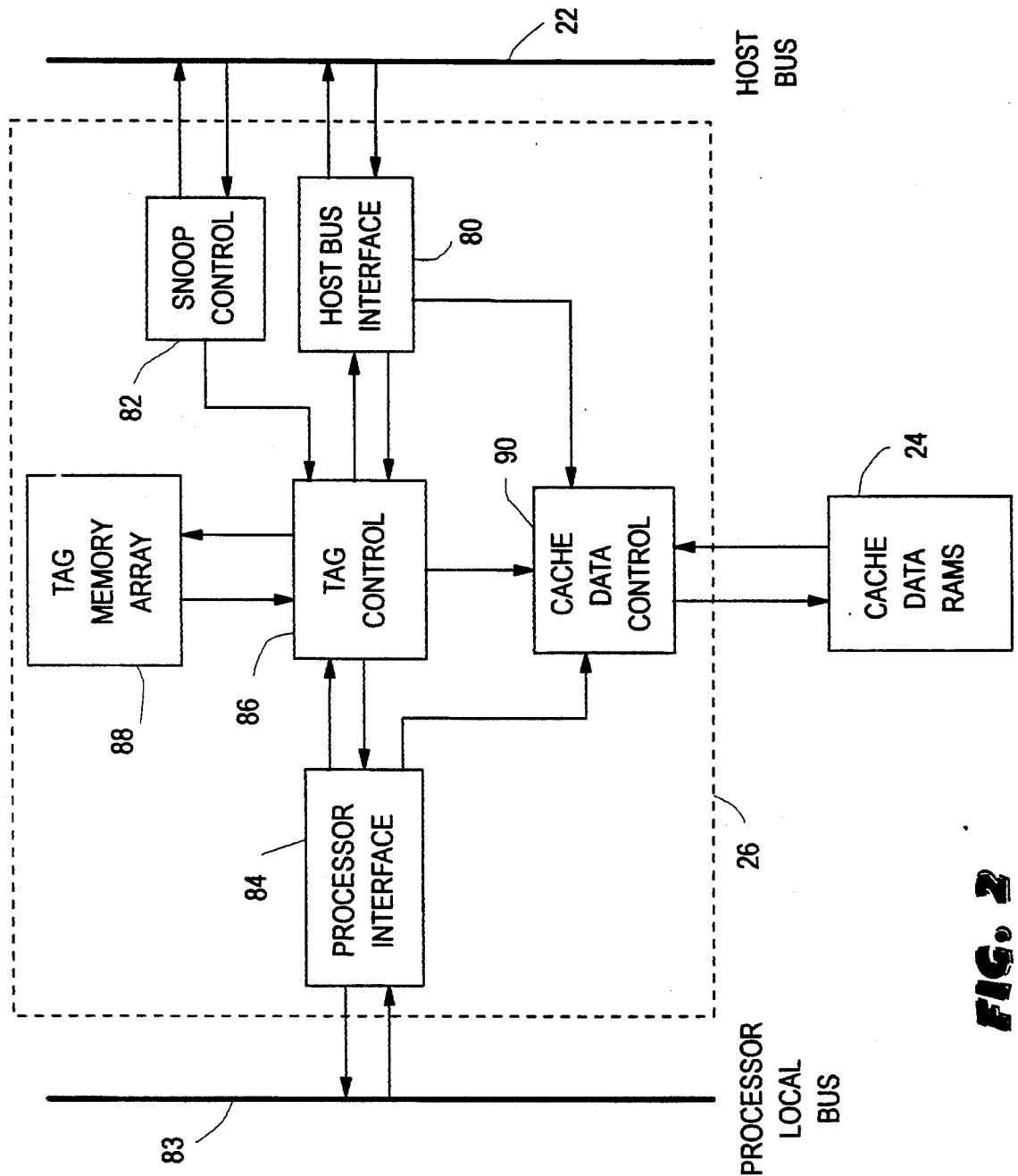
FIG. 2 is a block diagram of one of the cache controllers of FIG. 1.

The cache subsystem 23 preferably includes LRU and cache write policy information incorporated into its tag RAM's according to the present invention. In one embodiment of the invention, the cache subsystem 25 does not include the present invention but rather includes a standard cache controller such as the 82385 from Intel Corporation. In the preferred embodiment of the invention, the cache subsystems 23 and 25 are identical, and the cache subsystem 23 is described here for simplicity. Referring now to FIG. 2, a block diagram of the cache controller 26 of the present invention is shown. The cache controller 26 includes a host bus interface 80 and a snoop control 82 connected to the host bus 22. The cache controller 26 includes a processor interface 84 connected to a local processor bus 83 on the CPU 20. The host bus interface 80 and processor interface 84 are each connected to a tag control circuit 86. The tag control circuit 86 is connected to a tag memory area 88 where tag RAM's are located. The tag memory area 88 preferably includes two 512×40 bit tag RAM's. The tag RAM's include tag directories which hold cache write policy and partial LRU information according to the present invention, as is explained below, as well as address information used in matching the tag and a certain number of upper address bits generated by the memory access. The tag control circuit 86 controls the operation of the tag memory array 88. A cache data control circuit 90 is connected to the processor interface 84, the host bus interface 80, and the tag control circuit 86. The cache data control circuit 90 is connected to the cache data RAM's 24 and controls the flow of data into and out of the cache 24.

Figure 3:
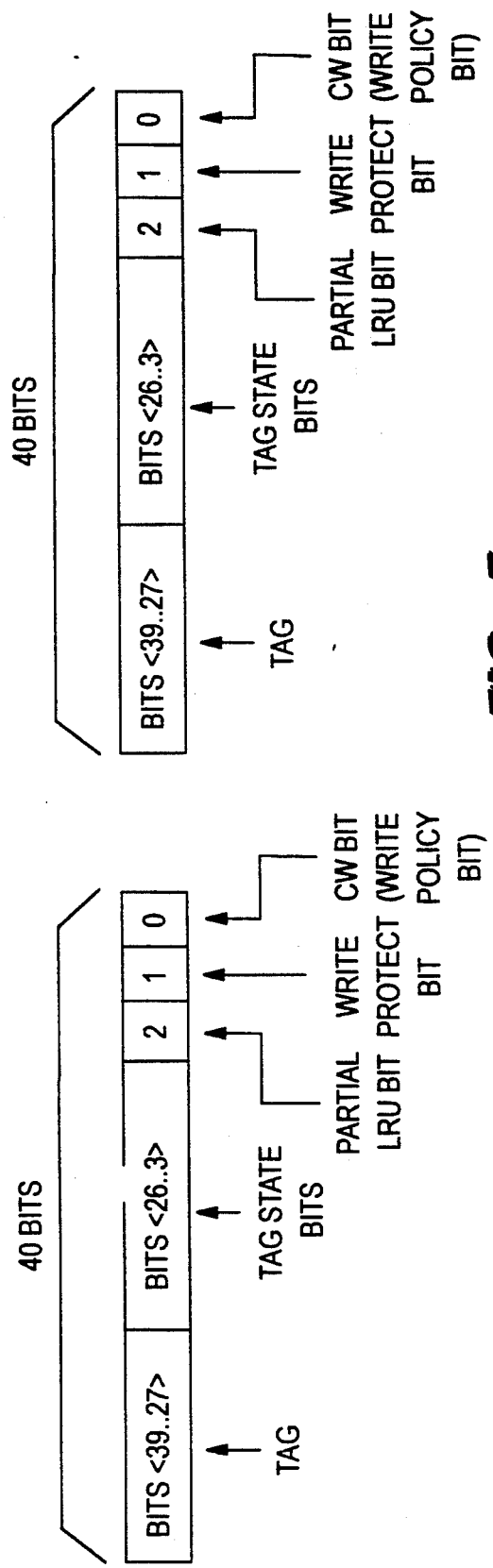
FIG. 3 depicts a tag entry in the tag memory area of FIG. 2.

The cache 24 is preferably organized as a 2-way set associative cache which includes two banks or ways of memory, referred to as way 0 and way 1. However, the use of a greater number of ways is also contemplated. It should be noted that the number of ways in the cache 24 only has meaning in the incorporation of LRU information into the tag RAMS. The number of ways in the cache 24 is irrelevant with regard to the incorporation of cache write policy information into the tag RAM's. Each of the cache ways way 0 and way 1 are comprised of a number of sets of data which in turn comprise a number of lines. Each of the cache ways have an associated cache directory, referred to as directory D1 and directory D2, respectively, that are located in tag RAM's in the tag memory area 88 in the cache controller 26. The directories D1 and D2 each include one entry for each of the sets in the respective cache ways. As shown in FIG. 3, the cache directory entry for each set is 40 bits wide and has five components: a tag, a number of tag state bits, a partial LRU bit according to the present invention, a write protect bit, and a write policy bit according to the present invention, as shown. Bits 39 through 27 of the directory entry comprise the tag field and hold the upper 13 address bits of the main memory address location of the copy of data that resides in the respective set of the cache. The remaining lower address bits serve as the "cache address" which directly selects one of the line locations in each of the ways way 0 and way 1 of the cache. The use of a 40 bit wide cache directory entry allows the use of conventionally available 8 bit RAM's without allowing bits to go unused.

Bits 26 through 3 of the directory entry, which comprise the tag state field, are used to hold status information on the lines in the respective set corresponding to the directory entry. Three bits are used for each byte in the line, so status is available for the 8 bytes preferably contained in each cache line. The possible states of the tag state bits in the preferred embodiment are invalid, shared unmodified, exclusive unmodified, and modified exclusive (owned). The shared unmodified state indicates that there may be more than one cache with an unmodified copy of a particular location's data. A processor write hit to a data entry designated as shared unmodified is broadcast to the host bus 22. Therefore, when a data entry is designated as shared unmodified, the cache controller 26 essentially employs a write-through policy for the respective data entry.

The CW or write policy bit, preferably stored in bit 0 of the tag directory entry, designates the cache write policy employed for the data entry corresponding to the respective tag directory entry. If the CW bit is 1, the cache controller 26 employs a write-back policy for the respective data entry. If the CW bit is 0, the cache controller 26 employs a write-through policy for the respective entry. The partial LRU bits stored in each of the tag directory entries hold information on the least recently used way for a respective set according to the present invention, as is explained below. Bit 1 of each tag directory entry holds a write-protect (WP) bit, which is preferably used to designate certain cached data entries as read only. When the WP bit is set for a respective tag entry, the corresponding cache location cannot be modified, and the respective tag state bits cannot be changed from the shared state. Thus, when the WP bit is set for a respective location, a write-through policy is designated for the location regardless of the status of the CW bit. In the preferred embodiment, the CW bit is always consistent with the WP bit such that when the WP bit is asserted for a respective cache entry, the CW bit is 0 to reflect a write-through policy.

Referring again to FIG. 2, the tag control circuit 86 includes logic according to the present invention which receives the H_CW signal from the host bus 22 and stores the cache write policy information into the CW bit in the appropriate tag directory entry during cache line fill operations after a cache read miss. It is noted that a cache allocation only occurs on a cache read miss according to the preferred embodiment. On cache write misses, the data is preferably posted to the host bus 22, and no cache allocation occurs. The tag control circuit 86 also includes logic according to the present invention which reads the CW bit on cache write operations to determine whether the respective data entry is designated as write-back or write-through. This logic also reads the WP bit to determine the write protect policy for the data entry. As noted above, when the WP bit is set, a write-through policy is employed for the respective data location.

When a cache read miss occurs and the cache controller 26 retrieves the requested data from memory, the DDF 46 generates the H_CW signal to designate the cache write policy for the respective data as write-back or write-through. If the H_CW signal is negated low, the tag control circuit 86 clears the CW bit in the respective tag directory entry to a 0 value. The tag control circuit 86 also sets the tag state bits to reflect a shared unmodified state, thus effectively designating a write-through policy for this data entry. Thereafter, when the processor 20 writes to this data entry and a cache write hit occurs, the tag control logic 86 reads the tag state bits to determine the state of the data entry. Since the state is shared unmodified, the cache controller 26 broadcasts the write onto the host bus 22. In addition, the tag control logic 86 reads the CW bit each time the tag state may need to be modified to determine the cache write policy of the data entry. If the CW bit is 0, reflecting a write-through policy, the tag control logic 86 maintains the shared unmodified state of the data entry, thus maintaining the write-through policy for the data entry.

When the cache system 23 receives a copy of data and the H_CW signal is asserted high, the tag control circuit 86 sets the CW bit in the respective tag directory entry to a 1 value, thus designating a write-back policy for this data entry. In this instance, since the CW bit is a 1 value, and a write-back policy is being employed, the tag control circuit 86 is free to change the state of the data entry as needed to implement the cache coherency protocol.

In the preferred embodiment, data stored in main memory 40 is designated as write-back, and data stored in memory situated on the EISA bus 60, which includes the expansion memory 62 and 64 and system ROM 66, is designated as write-through. The memory situated on the EISA bus 60 is designated as write-through because the EISA bus 60 and its support chips, principally the EBC 54, do not recognize inhibit or abort cycles. If a cache data entry from memory situated on the EISA bus 60 was designated as write-back, then a snoop read hit to the data entry which was modified or owned by the cache would cause the owning cache controller to attempt to inhibit the current memory cycle and provide the correct copy of data. However, since memory situated on the EISA bus 60 is attempting to provide the data, and the EISA bus 60 does not recognize inhibit cycles, the memory would not discontinue providing data when the inhibit cycles occurred. Therefore, the memory on the EISA bus 60 would attempt to provide an incorrect or "dirty" copy of the data back to the requesting device. In addition, this would result in both the system memory and the respective cache controller 26 both attempting to drive data onto the bus to the requesting device resulting in bus contention problems. Therefore, since the EISA bus 60 does not recognize inhibit cycles, cached data entries stored in memory situated on the EISA bus 60 are preferred to be designated as write-through to prevent a cache from owning a modified copy of this data. Also, the EISA bus 60 cannot have cycles aborted and therefore there is no way to prevent memory situated on the EISA bus 60 from returning the dirty data.

As previously mentioned, the CW bit in the tag directory entry is monitored on cache write hit operations to determine the cache write policy employed for the data corresponding to the respective tag entry. A bit in the tag directory entry is used because the H_CW signal from the DDF 46 develops too late for use by the tag control logic 86, the value not appearing until a period after an address is placed on the host bus 22. If the DDF 46 was accessed on a write hit to determine the respective cache write policy, then each write hit would produce a read cycle on the host bus 22 to determine the H_CW value, thus increasing bus traffic and removing any advantage of a write-back policy. By utilizing a bit in the tag directory entry, the information is available as soon as the other tag information, and therefore host bus traffic is reduced. In addition, the WP bit is monitored to determine the write protect status of the cache entry and, if the WP bit is set, a write-through policy is employed for the respective cache entry.

To summarize, when a cache read miss occurs, the DDF 46 provides the respective H_CW bit to the host bus 22 during the resulting cache line fill operation. The H_CW bit is stored in the respective tag directory entry as the CW bit along with the other tag and status information. When a cache write hit occurs, the CW bit of the respective tag directory entry is utilized to determine the cache write policy employed, i.e. whether the location is write-through or write-back.

As previously mentioned, the cache 24 is a 2-way set associative cache. However, the use of a greater number of ways is also contemplated. The cache controller 26 includes a replacement algorithm that determines which cache way, way 0 or way 1, in which to place new data on a cache read miss. In one embodiment of the invention, the replacement algorithm used is a least recently used (LRU) algorithm that places new data in the cache way that was least recently accessed by the processor 20 for data. This is because, statistically, the way most recently used is the way most likely to be needed again in the near future. In an LRU algorithm, LRU information associated with each set in the cache is pointed away from the cache way that was most recently accessed by the processor. Therefore, if data requested by the processor resides in way 1, then the LRU bit is pointed toward way 0. If the data requested by the processor resides in way 0, then the LRU bit is pointed toward way 1.

In the present embodiment, the replacement algorithm used is a modified LRU algorithm referred to as least recently modified (LRM). In one embodiment of this scheme, the partial LRU bits in each of the tag directories are updated only when a cache line replacement occurs on a read miss. In the present embodiment, the partial LRU bits are updated on cache line replacements and write hits. The choice of a replacement algorithm is generally irrelevant to the present invention, and it is suggested that a type of LRU or pseudo-LRU algorithm be chosen to optimize the particular cache design used in the chosen embodiment.

Since a tag in only one way is written at a time on a cache line replacement or cache write hit, a problem would arise if only one way's tag RAM held LRU information because the LRU information would not be updated properly when the other way was written. Therefore, as shown in FIG. 3, bit 2 in the tag directory of each way's tag RAM, referred to as a partial LRU bit, is reserved for LRU information according to the present invention. The partial LRU bit holds information such that, when this bit is XOR'ed with the partial LRU bit in the corresponding tag entry in the other way, the resultant value points to the least recently used tag of the two ways.

Referring again to FIG. 2, the tag control block 86 includes logic according to the present invention which generates the partial LRU bit information that is supplied to the tag directories in the tag RAM's 88. The tag control block circuit 86 also includes logic which reads the partial LRU bit information in the tag directories when a cache replacement is required and determines which way's tag has been least recently used.

Figure 4:
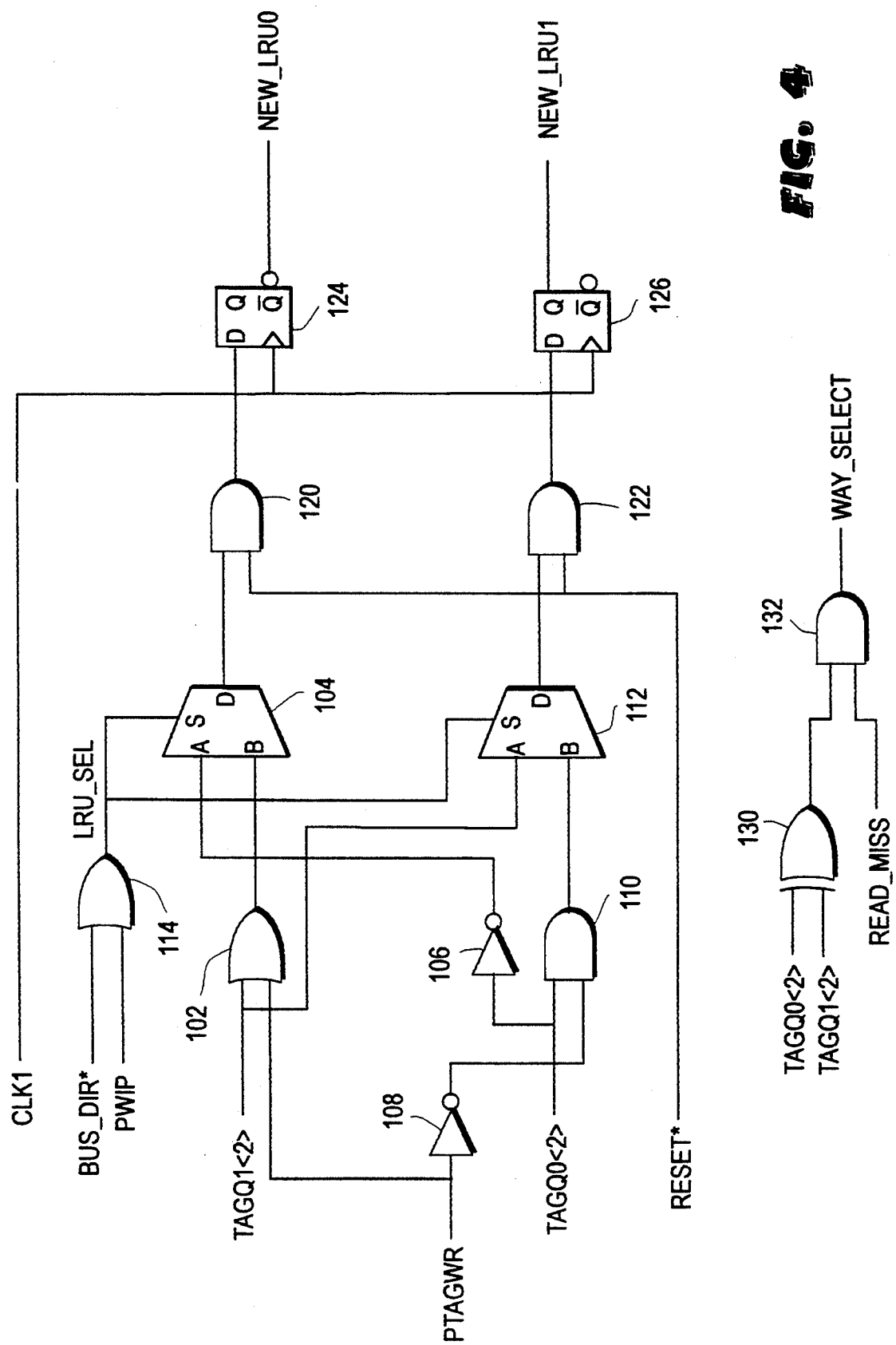
FIG. 4 is a schematic diagram of LRU bit generation and way select logic in the tag control area of FIG. 2 according to the present invention.

Referring now to FIG. 4, partial LRU bit generation logic and way select logic in the tag control block circuit 86 are shown. The partial LRU bits for way 0 and way 1 are referred to as TAGQ0<2> and TAGQ1<2> and generate corresponding signals referred to as the TAGQ0<2> signal and the TAGQ1<2> signal. The BUS_DIR* signal indicates when asserted low that the host bus interface 80 is active and either the cache controller 26 is accessing the host bus 22 or the cache controller 26 is performing a snoop access. The BUS_DIR* signal is negated high when a CPU access is occurring. The PWIP signal indicates that a posted write is in progress, meaning that a write operation is occurring on the host bus 22. The PWIP signal may indicate that either a write miss has occurred and the write is being performed on the host bus 22, or that a write is being posted on the host bus 22 due to a previous write hit. The FTAGWR signal indicates when asserted high that a flush condition is occurring.

The TAGQ1<2> signal and the FTAGWR signal are connected to the inputs of a two input OR gate 102 whose output is connected to the B input of a 2-to-1 multiplexor 104. The TAGQ0<2> signal is connected through an invertor 106 to the A input of the multiplexor 104. The FTAGWR signal is connected through an invertor 108 to the input of a two input AND gate 110. The TAGQ0<2> signal is connected to the other input of the AND gate 110. The output of the AND gate 110 is connected to the B input of a 2-to-1 multiplexor 112. The TAGQ1<2> signal is connected to the A input of the multiplexor 112.

The BUS_DIR* signal and the PWIP signal are connected to the inputs of a two input OR gate 114 whose output is a signal referred to as LRU_SEL. The LRU_SEL signal is provided to select inputs of each of the multiplexors 104 and 112. The output of the multiplexor 104 is connected to the input of a two input AND gate 120. The output of the multiplexor 112 is connected to the input of a two input AND gate 122. The second input to each of the AND gates 120 and 122 receives a system RESET* signal. The output of the AND gate 120 is connected to the D input of a D-type flip-flop 124. The output of the AND gate 122 is connected to the D input of a D-type flip-flop 126. The clock input of each of the flip-flops 124 and 126 receives a clocking signal referred to as CLK1 generated by the computer system S. The inverted Q output of the flip-flop 124 generates a signal referred to as NEW_LRU0, which is the new partial LRU bit for a tag directory entry in way 0. The Q output of the flip-flop 126 generates a signal referred to as NEW_LRU1, which is the new partial LRU bit for a tag directory entry in way 1.

The LRU_SEL signal is asserted either when the BUS_DIR* is negated high, indicating a CPU access to the cache and a possible cache line replacement, or the PWIP signal is asserted, indicating that a write operation is being posted on the host bus 22. Either of these two conditions are cases where new partial LRU bits are generated. The asserted LRU_SEL signal selects the B inputs to be output from each of the multiplexors 104 and 112. When the LRU_SEL signal is negated low, then no LRU update is occurring, the A inputs are output from the multiplexors 104 and 112, and the current values of the partial LRU bits remain unchanged.

The partial LRU bits in a respective tag entry are actually only updated with the NEW_LRU0 and NEW_LRU1 signals when a cache line replacement or write hit is decoded by other logic (not shown) according to the LRM technique used in the preferred embodiment. In an alternate embodiment of the invention a true least recently used algorithm is used in which the partial LRU bit in a respective tag entry are updated with new partial LRU bit information, NEW_LRU0 or NEW_LRU1, on each cache access. An LRM algorithm is employed in the preferred embodiment to reduce the number of updates required in the tag directory entries. According to the LRM algorithm of the preferred embodiment, the partial LRU bits in a tag directory entry are updated only when the tag directory entry is required to be updated for other reasons, such as a cache line replacement or cache write hit.

The FTAGWR signal acts to reset the partial LRU bits for each of the ways to 0 when a flush condition occurs. When the FTAGWR signal is asserted high, the NEW_LRU0 and NEW_LRU1 signals are both logic low values. The NEW_LRU0 signal is output from the inverted Q output of the flip-flop 124 so that way 0 is written with the inverted value of the old LRU1 value (the TAGQ1<2> signal) when an LRU update is required. Since the NEW_LRU0 signal is generated from the inverted Q output of the flip-flop 124, the TAGQ0<2> signal is connected through the invertor 106 to the A input of the multiplexor 104 to allow the old value of LRU0 to remain unchanged when no LRU update is occurring.

The tag control logic 86 includes logic which determines which cache way is loaded when a cache line replacement is required because of a read miss. The TAGQ0<2> signal and the TAGQ1<2> signal are connected to the inputs of a two-input Exclusive-OR gate 130. The output of the XOR gate 130 and a signal referred to as READ_MISS are connected to the inputs of a two input AND gate 132. The READ_MISS signal decodes the condition where a read miss has occurred and a cache line replacement is required. The output of the AND gate 132 is a signal referred to as WAY_SELECT, which selects the appropriate way to be updated by new data on the cache line replacement. Therefore, when a read miss has occurred and the read miss Signal is asserted, the Exclusive-OR of the two partial LRU bits TAGQ0<2> and TAGQ1<2> determine which way is updated with new data in the cache line replacement.

As an example, assume that the partial LRU bits in corresponding tag directory entries of way 0 and way 1 are 0 and 1, respectively. Accordingly, the TAGQ0<2> and TAGQ1<2> signals will have 0 and 1 values, respectively. If a cache read miss occurs and a cache line replacement is required, the XOR of TAGQ0<2> and TAGQ1<2> produce a 1 value, indicating that way 1 should receive the cache line. In addition, new partial LRU bits are generated on the cache read miss. On the cache read miss, the BUS_DIR* signal will be negated high, selecting the B inputs of the multiplexor 104 and 112 as shown in FIG. 4. The TAGQ1<2> signal is passed through the OR gate 102, the multiplexor 104, and the AND gate 120, and is inverted in the flip-flop 124 to produce NEW_LRU0. Since TAGQ1<2> is a 1 value, NEW_LRU0 will be a 0 value. The TAGQ0<2> signal is passed through the AND gate 110, multiplexor 112, the AND gate 122, and the flip-flop 126 to produce NEW_LRU1. Since TAGQ0(2) is a 0 value, NEW_LRU1 will also be a 0 value. In this manner, the new partial LRU bit for way 0 is the inverted value of the partial LRU bit from way 1, and the new partial LRU bit for way 1 is the value of the previous partial LRU bit from way 0. Thus the new partial LRU bits for the respective directory entry in way 0 and way 1 will be 0, 0. On a subsequent cache line replacement, the XOR of the new partial LRU bits will be 0, pointing to way 0 as the least recently modified way.

As previously mentioned, the present invention can be generalized to work with caches which include a number of ways greater than two. According to this method, a pseudo-LRU (or pseudo-LRM) algorithm is used, the number of ways in the cache is preferably a multiple of two, and extra bits are added in the tag RAM's for each multiple of two factor that the number of ways is greater than two. In addition, an extra layer of Exclusive-OR operation is included for each of the extra bits added in the tag RAM's.

As an example, the method of the present invention is applied to a 4 way cache. In a pseudo-LRU scheme, the 4 ways are divided into groups of two labeled group 0 and group 1, and an extra partial-LRU bit referred to as a group select bit in each of the tag directories is used to distinguish between which group of ways was least recently used. The group select bits are manipulated such that, when a cache line replacement is required, the bits in the two ways forming each group are XOR'ed together to produce a value for each group, and these group values are then XOR'ed together to produce a value pointing to the group least recently used.

When LRU information needs to be updated, the group select bits are manipulated in a similar manner to that described above for a two-way cache. The group select bit in a respective way's tag entry in group 0 is modified such that, when this bit is XOR'ed with the group select bit in the other way's corresponding tag entry in group 0, the resulting value is equivalent to the inverse of the Exclusive-OR value of the corresponding group select bits in the two ways in group 1. The group select bit in a respective way's tag entry in group 1 is modified such that, when this bit is XOR'ed with the group select bit in the other way's tag entry in group 1, the resulting value is equivalent to the Exclusive-OR value of the corresponding group select bits in group 0. Because this method can be used to distinguish between any two groups of ways, this method can be generalized to any multiple way cache which includes a number of ways that is a multiple of two. Once a group of two ways has been identified as least recently used, the method of the present invention described above with regard to a 2-way cache can readily be applied to determine which of the two ways in the selected group was least recently used.

Figure 5:
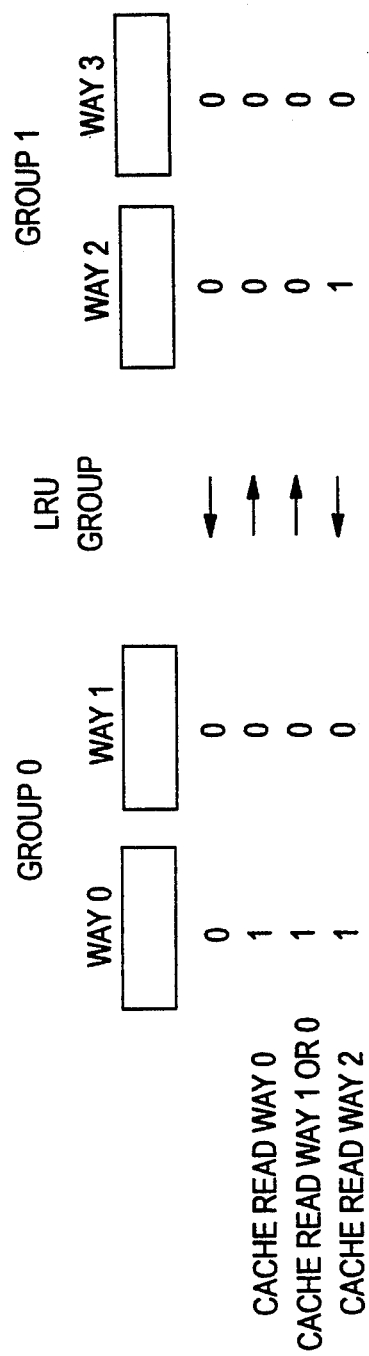
FIG. 5 is an illustration of how the incorporation of LRU information into the tag RAM's can be generalized to multiple way caches with a number of ways greater than two using a pseudo-LRU algorithm.

As an example of the above method, consider a 4 way cache where the ways are partitioned into groups of two and a pseudo-LRU algorithm is used. The method can be readily applied to a pseudo-LRU algorithm by simply updating the group select bit on each cache access such that an XOR of the XOR'ed group select bits in each group point to the least recently used group. As shown in FIG. 5, the groups are referred to as group 0 and group 1. We assume that the group select bits in the tags of each of the ways are initially 0, as shown. Xoring the bits together for each group produces 0,0, which, when XOR'ed together produce a 0. Therefore, the least recently used group is initially determined to be group 0. Assume that a cache read occurs to a tag in way 0. Upon completion of the read, the group select bit in way 0 is modified to a 1 value, and all of the other group select bits remain the same, as shown. The group select bit in way 0 is modified to a 1 value so that an XOR of the group select bits in group 0 is a 1, which is the inverse of the XOR of the old values in ways 2 and 3. XORing the bits together for each group produces 1,0, which, when XOR'ed together, produces a 1. Thus the least recently used group is now determined to be group 1. If a subsequent cache read occurs to either way 0 or way 1, the group select bits in these ways remain unchanged because the XOR value of group 0 is already the inverse of the XOR value of group 1, and thus the LRU group remains group 1. If the next cache read occurs to either ways 2 or 3, upon completion of the read the group select bit in the respective way is updated to a 1 value, and all of the other group select bits remain the same. As shown in FIG. 5, a cache read to way 2 is assumed to occur, and the group select bit in way 2 is modified to a 1. The group select bit in way 2 is modified to a 1 value so that an XOR of the group select bits in group 1 is a 1, which is the XOR of the group select bits in ways 0 and 1. XORing the group select bits together for each group produces 1, 1, which, when XOR'ed together, produces a 0. Thus the least recently used group is now determined to be group 0. This method continues onward, changing the group select bit in the respective way being updated so that the ways forming the opposite group are targeted as the least recently used group.

Therefore, a method is disclosed which allows cache line replacement information to be incorporated into the tag directories in a multiple way set associative cache. This obviates the necessity of having a separate RAM for cache line replacement information. In addition, a method for incorporating cache write policy information into the tag RAM's is disclosed. This method allows a cache system to employ write-through and write-back policies for different blocks. This enables the cache system to employ a write-through policy in a multiprocessor system for main memory while also caching data entries located in memory situated on an I/O bus which does not recognize inhibit or abort cycles.

The foregoing disclosure and description of the invention are illustrative and explanatory thereof, and various changes in the size, components, construction and method of operation may be made without departing from the spirit of the invention.

We claim:

1. A method for incorporating cache line replacement information into tag memory in a cache subsystem organized as a multiple way cache which includes first and second ways, the cache subsystem having a cache controller and tag memory associated with each of the cache ways, the tag memory including a plurality of tag entries, wherein tag entries in tag memory associated with the first way correspond to tag entries in tag memory associated with the second way and each of the tag entries includes cache line replacement information comprising a replacement bit having either of two opposite value, the method comprising:

changing the replacement bit in a tag entry associated with the first way to the opposite value of the replacement bit from a corresponding tag entry associated with the second way when cache line replacement information is being updated in said tag entry associated with the first way;

changing the replacement bit in a tag entry associated with the second way to the value of the replacement bit from a corresponding tag entry associated with the first way when cache line replacement information is being updated in said tag entry associated with the second way; and calculating an Exclusive-OR value from corresponding first and second way tag entry replacement bits when a cache line replacement is required to determine a way into which a line will be placed, wherein said Exclusive-OR value points to the way where said cache line is to be placed.

2. The method of claim 1, wherein the multiple way cache is a 2 way set-associative cache.

3. The method of claim 1, further comprising:
setting the replacement bits in each of the tag entries to an initial value when the cache subsystem is flushed.

4. The method of claim 1, wherein the cache may include a number of ways greater than two, the ways are organized into first and second groups, and each of the tag entries include a group select bit, the method further comprising:

changing the group select bit in a tag entry in the first group such that the Exclusive-OR value of the group select bits in tag entries in the first group is opposite of the Exclusive-OR value of group select bits in corresponding tab entries in the second group when cache line replacement information is being updated in said tag entry in the first group;

changing the group select bit in a tag entry in the second group such that the Exclusive-OR value of the group select bits in tag entries in the second group is the Exclusive-OR value of group select bits in corresponding tag entries in the first group when cache line replacement information is being updated in said tag entry in the second group; and calculating the Exclusive-OR value from the Exclusive-OR of the group select bits for corresponding tag entries in each group when a cache line replacement is required to determine the group into which the line will be placed, wherein said Exclusive-OR value points to the group where the cache line is to be placed.

5. A cache subsystem which incorporates cache line replacement information into tag memory, the cache subsystem organized as a multiple way cache which includes first and second ways, comprising:

a cache controller;

tag memory coupled to said cache controller and associated with each of the cache which includes a plurality of tag entries, wherein tag entries in tag memory associated with the first way correspond to tag entries in tag memory associated with the second way and each of said tag entries includes cache line replacement information comprising a replacement bit having one of two opposite values;

means coupled to said tag memory for changing the replacement bit in a tag entry associated with the first way to the opposite value of the replacement bit from a corresponding tag entry associated with the second way when cache line replacement information is being updated in said tag entry associated with the first way;

means coupled to said tag memory for changing the replacement bit in a tag entry associated with the second way to the value of the replacement bit from a corresponding tag entry associated with the first way when cache line replacement information is being updated in said tag entry associated with the second way; and means coupled to said tag memory for calculating the Exclusive-OR value from corresponding first and second way tag entry replacement bits when a cache lie replacement is required to determine the way into which the line will be placed, wherein said Exclusive-OR value points to the way where said cache line is to be placed.

6. The cache subsystem of claim 5, wherein said cache memory is 2 way set-associative cache memory.

7. The cache subsystem of claim 5, wherein said cache controller further comprises:
means coupled to said tag memory for setting the replacement bits in each of said tag entries to an initial value when the cache subsystem is flushed.

8. A method for incorporating cache write policy information into tag memory in a cache subsystem having a cache controller, cache memory which holds data entries, and tag memory which includes a plurality of tag entries that correspond to data entries stored in the cache memory, the cache subsystem being comprised in a computer system having memory and a means for generating cache write policy information to the cache subsystem when the cache subsystem receives data from the computer system memory, the method comprising:

the cache controller receiving cache write policy information from the generating means when the cache memory receives a data entry from the computer system memory;

the cache controller setting a bit in the tag entry corresponding to said data entry indicating the cache write policy of said data entry;

the cache controller reading said bit in said corresponding tag entry to determine the cache write policy for said data entry when a cache write hit occurs to said data entry; and the cache controller employing the cache write policy as determined by said bit.

9. The method of claim 8, wherein the computer system includes multiple processors, data entries stored in the cache memory have an associated state, wherein the associated state determines whether a write-back or write-through policy is employed, and each of the tag entries includes a plurality of state bits which represent the state of corresponding data entries, the method further comprising:

the cache controller setting the state bits in a tag entry to a state which employs a write-through policy when it receives cache write policy information from the generating means designating a write-through policy for a data entry corresponding to said tag entry; and the cache controller setting the state bits in a tag entry to a state which employs a write-back policy when it receives cache write policy information from the generating means designating a write-back policy for a data entry corresponding to said tag entry.

10. The method of claim 9, the computer system having a first bus, a second bus, memory coupled to the first bus, and memory coupled to the second bus, wherein the first bus may have cycles aborted and the second bus cannot have cycles aborted, the method further comprising:

the generating means generating cache write policy information indicating a write-back policy for data entries stored in the memory coupled to the first bus; and the generating means generating cache write policy information indicating a write-through policy for data entries stored in the memory coupled to the second bus.

11. The method of claim 9, the computer system having a first bus, a second bus, memory coupled to the first bus memory coupled to the second bus, wherein the first bus recognizes write-back inhibit cycles and the second bus does not recognize write-back inhibit cycles, the method further comprising:

the generating means generating cache write policy information indicating a write-back policy for data entries stored in the memory coupled to the first bus; and the generating means generating cache write policy information indicating a write-through policy for data entries stored in the memory coupled to the second bus.

12. A computer system having a cache subsystem which incorporates cache write policy information into tag memory, the computer system having a first bus, memory coupled to the firs bus, and a means coupled to the first bus for generating cache write policy information to the cache subsystem when the cache subsystem receives data, the cache subsystem being coupled to the first bus and comprising:

cache memory coupled to the first bus;

a cache controller coupled to the first bus and said cache memory;

tag memory coupled to the first bus and said cache controller which includes a plurality of tag entries that correspond to data entries stored in said cache memory;

means coupled to the first bus for receiving cache write policy information from the generating means when the cache memory receives a data entry from the computer system memory;

means coupled to said tag memory and said receiving means for setting a bit in the tag entry corresponding to said data entry indicating the cache write policy of said data entry;

means coupled to said tag memory for reading said bit in said corresponding tag entry to determine the cache write policy for said data entry when a cache write hit occurs to said data entry; and means coupled to said bit reading means for employing the cache write policy as determined by said bit.

13. The computer system of claim 12, the computer system further including multiple processors, wherein data entries stored in said cache memory have an associated state which determines whether a write-back or write-through policy is employed for the associated data entry, and wherein each of said tag entries includes a plurality of state bits which represent the state of corresponding data entries, the cache controller further comprising:

means coupled to said tag memory and said receiving means for setting the state bits in a tag entry to a state which employs a write-through policy when said receiving means receives cache write policy information from the generating means designating a write-through policy for a data entry corresponding to said tag entry; and means coupled to said tag memory and said receiving means for setting the state bits in a tag entry to a state which employs a write-back policy when said receiving means receives cache write policy information from the generating means designating a write-back policy for a data entry corresponding to said tag entry.

14. The computer system of claim 12, further comprising:

a second bus; and memory coupled to said second bus;

wherein the first bus can have cycles aborted and the second bus cannot have cycles aborted, wherein the generating means includes:

means for generating cache write policy information indicating a write-back policy for data entries stored in the memory coupled to the first bus; and means for generating cache write policy information indicating a write-through policy for data entries stored in the memory coupled to the second bus.

15. The computer system of claim 12, further comprising:

a second bus; and memory coupled to said second bus;

wherein the first bus recognizes write-back inhibit cycles and the second bus does not recognize write-back inhibit cycles, wherein the generating means includes:

means for generating cache write policy information indicating a write-back policy for data entries stored in the memory coupled to the first bus; and means for generating cache write policy information indicating a write-through policy for data entries stored in the memory coupled to the second bus.

* * * * *